US010762727B2

(12) United States Patent
Ponda et al.

(10) Patent No.: US 10,762,727 B2
(45) Date of Patent: Sep. 1, 2020

(54) ESTIMATION OF AERIAL VEHICLE STATE

(71) Applicant: LOON LLC, Mountain View, CA (US)

(72) Inventors: Sameera S. Ponda, Mountain View, CA (US); Salvatore J. Candido, Mountain View, CA (US)

(73) Assignee: LOON LLC, Mountain View, CA (US)

(*) Notice: Subject to any disclaimer, the term of this patent is extended or adjusted under 35 U.S.C. 154(b) by 371 days.

(21) Appl. No.: 15/857,932

(22) Filed: Dec. 29, 2017

(65) Prior Publication Data
US 2019/0206156 A1 Jul. 4, 2019

(51) Int. Cl.
G05D 1/04 (2006.01)
G07C 5/08 (2006.01)
B64D 43/00 (2006.01)

(52) U.S. Cl.
CPC ........... G07C 5/0841 (2013.01); B64D 43/00 (2013.01)

(58) Field of Classification Search
CPC combination set(s) only.
See application file for complete search history.

(56) References Cited

U.S. PATENT DOCUMENTS

| 6,502,042 | B1 * | 12/2002 | Eid ..................... G01F 23/0069 702/50 |
| 6,628,941 | B2 | 9/2003 | Knoblach et al. |
| 7,103,460 | B1 * | 9/2006 | Breed ................. B60C 23/0408 701/29.1 |
| 7,203,491 | B2 | 4/2007 | Knoblach et al. |
| 7,356,390 | B2 | 4/2008 | Knoblach et al. |
| 7,469,857 | B2 | 12/2008 | Voss |
| 7,801,522 | B2 | 9/2010 | Knoblach et al. |
| 8,820,678 | B2 | 9/2014 | DeVaul et al. |
| 8,825,232 | B2 | 9/2014 | Knoblach et al. |
| 8,967,533 | B2 | 3/2015 | DeVaul et al. |
| 9,139,279 | B2 | 9/2015 | Heppe |
| 9,296,461 | B1 | 3/2016 | Roach |
| 9,329,600 | B2 | 5/2016 | DeVaul et al. |
| 9,377,852 | B1 * | 6/2016 | Shapiro ................... G06F 3/013 |
| 9,409,646 | B2 | 8/2016 | Fleck |
| 9,418,243 | B2 | 8/2016 | Bauer et al. |
| 9,419,902 | B1 | 8/2016 | Sites |
| 9,420,023 | B2 | 8/2016 | Ramamurthy et al. |
| 9,519,045 | B2 | 12/2016 | Knoblach et al. |
| 9,632,503 | B2 | 4/2017 | Knoblach et al. |
| 9,836,063 | B1 * | 12/2017 | Bonawitz ................. B64B 1/40 |

(Continued)

FOREIGN PATENT DOCUMENTS

WO 2017/213706 A1 12/2017

Primary Examiner — Masud Ahmed
(74) Attorney, Agent, or Firm — Marton Ribera Schumann & Chang LLP; Chien-Ju Alice Chuang; Hector J. Ribera

(57) ABSTRACT

A system for estimating aerial vehicle status includes an aerial vehicle, a computing device, and a wireless communication link that communicatively couples the aerial vehicle and the computing device. The aerial vehicle includes a sensor that outputs telemetry data. The computing device includes a processor and a memory. The memory stores instructions that, when executed by the processor, cause the computing device to retrieve the telemetry data from the sensor via the wireless communication link, execute an estimation algorithm based at least in part on the telemetry data, and determine a state of the aerial vehicle based on a result of the estimation algorithm.

19 Claims, 4 Drawing Sheets

(56) References Cited

U.S. PATENT DOCUMENTS

| | | | |
|---|---|---|---|
| 10,439,675 B2* | 10/2019 | Johnson | H01P 5/103 |
| 10,542,093 B2* | 1/2020 | Ayyagari | H04L 67/12 |
| 2008/0294285 A1* | 11/2008 | Shoham | B25J 9/1623 |
| | | | 700/245 |
| 2010/0230968 A1 | 9/2010 | Chernyshov | |
| 2014/0127081 A1* | 5/2014 | Fine | C01B 21/24 |
| | | | 422/119 |
| 2015/0251771 A1* | 9/2015 | Whitlow | B64D 45/00 |
| | | | 701/3 |
| 2016/0009411 A1* | 1/2016 | Davalos | B64D 47/02 |
| | | | 345/156 |
| 2017/0280351 A1* | 9/2017 | Skaaksrud | H04W 76/11 |
| 2018/0343400 A1* | 11/2018 | Campbell | G02B 13/06 |

* cited by examiner

ESTIMATION OF AERIAL VEHICLE STATE

BACKGROUND

A fleet of aerial vehicles deployed in the atmosphere has myriad possible uses. Effective and efficient control of the aerial vehicles in the fleet is desirable for most uses. It would be beneficial if reliable, consistent, and actionable data were available to facilitate effective control of the aerial vehicles. In a variety of circumstances, however, such data may be unreliable, inaccurate, incomplete, or wholly unavailable. Insufficiencies in such data are compounded as the number of aerial vehicles in the fleets increases. In view of the foregoing, it would be beneficial to have systems and methods for estimating a state (also referred to as status) of an aerial vehicle and for effectively and efficiently controlling the aerial vehicle based on the estimated state, even in circumstances where helpful data may be lacking.

SUMMARY

In one aspect, this disclosure describes a system for estimating aerial vehicle status. The system includes an aerial vehicle, a computing device, and a wireless communication link that communicatively couples the aerial vehicle and the computing device. The aerial vehicle includes a sensor that outputs telemetry data. The computing device includes a processor and a memory. The memory stores instructions that, when executed by the processor, cause the computing device to retrieve the telemetry data from the sensor via the wireless communication link, execute an estimation algorithm based at least in part on the telemetry data, and determine a state of the aerial vehicle based on a result of the estimation algorithm.

In embodiments, the memory stores further instructions that, when executed by the processor, cause the computing device to detect a failure of the sensor of the aerial vehicle and, in response, automatically switch to a secondary data source. The secondary source may include at least one of a backup sensor of the aerial vehicle, a sensor of another aerial vehicle, a weather data source, or an estimation module of the computing device.

In embodiments, the memory stores further instructions that, when executed by the processor, cause the computing device to execute a plurality of estimation algorithms by way of a plurality of respective estimation modules, each having a corresponding input and a corresponding output, and each being independently configurable to be enabled or disabled.

In embodiments, the memory stores further instructions that, when executed by the processor, cause the computing device to execute a plurality of estimation algorithms by way of a plurality of estimation modules, each having a corresponding input, output, and hierarchy level. The corresponding hierarchy levels define an order by which the plurality of estimation modules are executed.

In embodiments, the memory stores further instructions that, when executed by the processor, cause the computing device to execute the plurality of estimation algorithms in the order defined by the hierarchy levels.

In embodiments, the executing of the estimation algorithm includes at least one of filtering the telemetry data or supplementing a missing portion of the telemetry data with estimated telemetry data.

In embodiments, the executing of the estimation algorithm includes combining a plurality of data from a plurality of sources, respectively, wherein the plurality of data includes at least one of the telemetry data, wind data, temperature data, or infrared data, and wherein the plurality of sources includes at least one of a plurality of sensors of the aerial vehicle or weather data sources.

In embodiments, the determining of the state of the aerial vehicle includes determining an amount of gas remaining in the aerial vehicle.

In embodiments, the determining of the state of the aerial vehicle includes determining a predicted remaining flight lifetime of the aerial vehicle.

In embodiments, the determining of the state of the aerial vehicle includes determining a present state of the aerial vehicle.

In embodiments, the executing of the estimation algorithm includes detecting an error in the telemetry data and generating a correction to the error.

In embodiments, the memory stores further instructions that, when executed by the processor, cause the computing device to generate an alert based on a predetermined rule and the determined state of the aerial vehicle.

In embodiments, the memory stores further instructions that, when executed by the processor, cause the computing device to generate a graphical representation of the determined state of the aerial vehicle.

In embodiments, the graphical representation of the determined state of the aerial vehicle includes a linear plot of the determined state of the aerial vehicle against another variable.

In another aspect, this disclosure describes a method for estimating aerial vehicle status. The method includes retrieving, by way of a wireless communication link, telemetry data from a sensor of an aerial vehicle; executing an estimation algorithm based at least in part on the telemetry data; and determining a state of the aerial vehicle based on a result of the estimation algorithm.

In embodiments, the method further includes detecting a failure of the sensor of the aerial vehicle and, in response to the detecting of the failure, switching to a secondary data source.

In embodiments, the method further includes executing a plurality of estimation algorithms by way of a plurality of respective estimation modules, each having a corresponding input and a corresponding output, and each being independently configurable to be enabled or disabled.

In embodiments, the method further includes executing a plurality of estimation algorithms by way of a plurality of estimation modules, each having a corresponding input, output, and hierarchy level. The corresponding hierarchy levels define an order by which the plurality of estimation modules are executed.

In yet another aspect, this disclosure describes a non-transitory computer-readable medium for estimating aerial vehicle status. The computer-readable medium has stored thereon instructions that, when executed by a processor, cause the processor to retrieve, by way of a wireless communication link, telemetry data from a sensor of an aerial vehicle; execute an estimation algorithm based at least in part on the telemetry data; and determine a state of the aerial vehicle based on a result of the estimation algorithm.

BRIEF DESCRIPTION OF THE DRAWINGS

Various aspects and features of the present systems and methods for estimating aerial vehicle status are described herein below with references to the drawings, wherein.

DETAILED DESCRIPTION

The present disclosure is directed to systems and methods for estimating the status of one or more aerial vehicles of a fleet of aerial vehicles deployed in the atmosphere, thereby increasing the effectiveness of the fleet for its myriad possible uses. In one aspect, the systems and methods of the present disclosure facilitate the estimation of a status or state of an aerial vehicle, and facilitate the effective and efficient control of the aerial vehicle, based on the estimated state, even in circumstances where helpful data may be lacking (for example, unreliable, inaccurate, incomplete, or wholly unavailable). In general, and as described in further detail below, the systems and methods described herein are configured to estimate the status of an aerial vehicle based on telemetry data obtained from the aerial vehicle and estimation algorithms executed by estimation modules of a land-based network of computing devices in communication with one another and/or the aerial vehicle. In some examples, the status estimations described herein are executed by way of multiple services available via the networked computing devices, thereby improving the efficiency with which the estimations are executed, for instance, even in the face of a communication lag between the computing devices and the aerial vehicle. The embodiments herein are able to estimate the status of the aerial vehicle even in circumstances where helpful data may be lacking, based at least in part on detecting and accounting for deficiencies in telemetry data, such as through reconfiguration of data sources, estimation modules, and/or estimation algorithms. The systems and methods described herein facilitate the effective control of the aerial vehicle by providing fleet control personnel or systems with more detailed, accurate, and actionable information than sensors alone could provide regarding aspects of aerial vehicles in the fleet. The present systems and methods employ discrete estimator modules and a hierarchical dependency tree that enables individual estimator modules to be selectively enabled or disabled, depending on the needs of specific estimations. Additionally, the discrete estimator modules can be activated based on which particular output is being requested from a user interface (e.g., graph) by working backwards from the requested output to determine which signals need to be computed. In this manner, the efficiency in which processor time, memory resources, and energy are utilized may be improved, and the speed with which estimations may be completed may be increased, without which, the estimations may be unfeasible for a fleet having a sizeable number of aerial vehicles each with a significant number of sensors and data to be processed.

Figure 1:
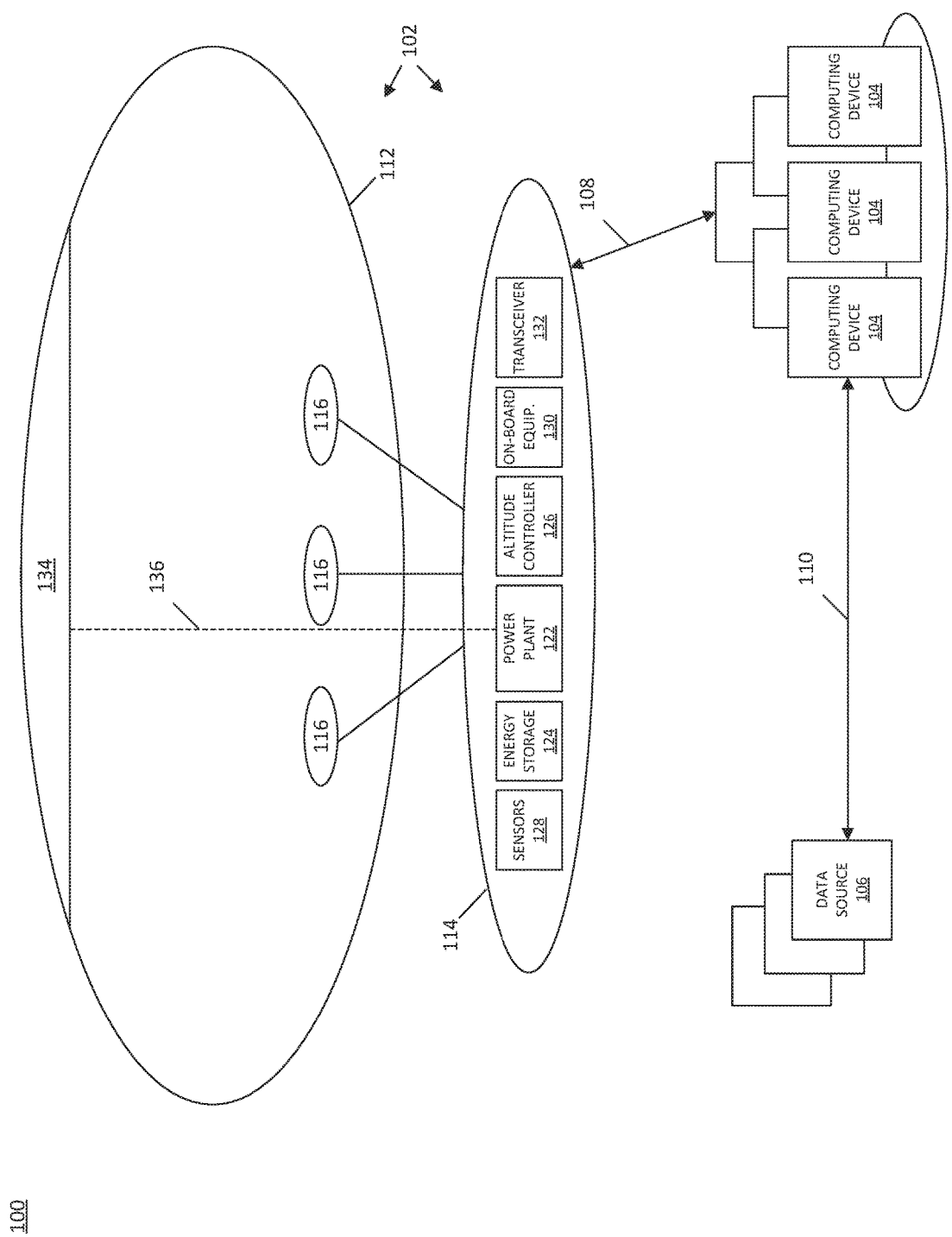
FIG. 1 is a schematic diagram of an illustrative aerial vehicle system, in accordance with an embodiment of the present disclosure.

With reference to FIG. 1, an illustrative aerial vehicle system 100 includes an aerial vehicle 102, one or more computing devices 104 (for example, servers), and one or more data sources 106, none of which is drawn to scale. Although FIG. 1 shows a particular type of aerial vehicle 102, this is not intended to limit the scope of the present disclosure. Aspects of the present disclosure are also applicable to stratospheric gliders or any other type of remote vehicle. The aerial vehicle 102 and the computing devices 104 are communicatively coupled to one another by way of a first wireless communication link 108, and the computing devices 104 and the data sources 106 are communicatively coupled to one another by way of a second wireless communication link 110. In some aspects, the aerial vehicle 102 is configured to be launched into and moved about the atmosphere, and the computing devices 104 cooperate as a ground-based distributed array to perform their functions described herein. The data sources 106 may include airborne data sources, such as airborne weather balloons, additional airborne aerial vehicles 102, and/or the like, and/or ground-based data sources, such as publicly available and/or proprietary databases. Although the present disclosure is provided in the context of an embodiment where the system 100 includes multiple computing devices 104 and multiple data sources 106, in other embodiments the system 100 may include a single computing device 104 and a single data source 106. Further, although FIG. 1 shows a single aerial vehicle 102, in various embodiments the system 100 includes a fleet of multiple aerial vehicles 102 that are positioned at different locations throughout the atmosphere and that are configured to communicate with the computing devices 104, the data sources 106, and/or one another by way of the communication links 108 and/or 110.

In various embodiments, the aerial vehicle 102 may be configured to perform a variety of functions or provide a variety of services, such as, for instance, telecommunication services (e.g., long term evolution (LTE) service), hurricane monitoring services, ship tracking services, services relating to imaging, astronomy, radar, ecology, conservation, and/or other types of functions or services. In general, the systems and methods of the present disclosure provide techniques for estimating the status of the aerial vehicles 102 to facilitate effective and efficient performance of their functions or provision of their services, as the case may be. As described in further detail herein, the computing devices 104 are configured to execute one or more estimation algorithms by way of estimation modules to estimate the status of the aerial vehicles 102 during flight.

With continued reference to FIG. 1, the aerial vehicle 102 includes an outer balloon 112 and a gondola 114, which is suspended beneath the outer balloon 112 while the aerial vehicle 102 is in flight. The outer balloon 112 includes multiple ballonets 116 which, as described in further detail below, are used to control the buoyancy, and in turn the altitude, of the aerial vehicle 102 in flight. In some aspects, the ballonets 116 include air and the outer balloon 112 include a lifting gas that is lighter than air. The altitude controller 126 controls a pump and a valve (neither of which is shown in FIG. 1) to pump air into the ballonets 116 (from air outside the aerial vehicle 102) to increase the mass of the aerial vehicle 102 and lower its altitude, or to release air from the ballonets 116 (into the atmosphere outside the aerial vehicle 102) to decrease the mass of the aerial vehicle 102 and increase its altitude. The combination of the altitude controller 126, the outer balloon 112, the ballonets 116, and the valves and pumps (not shown in FIG. 1) may be referred to as an air-gas altitude control system.

The outer balloon 112 also has one or more solar panels 134 affixed to its upper portion that absorb sunlight, when available, and generate electrical energy from the absorbed sunlight. The solar panels 134 provide, by way of power paths such as power path 136, the generated electrical energy to the various components of the aerial vehicle 102, such as components housed within the gondola 114, for utilization during flight.

The gondola 114 includes a variety of components, some of which may or may not be included in specific embodiments of the aerial vehicle 102, depending upon the application and/or needs. Although not expressly shown in FIG. 1, the various components of the aerial vehicle 102 in general, and/or of the gondola 114 in particular, may be coupled to one another for communication of power, data, and/or other signals or information. The example gondola 114 shown in FIG. 1 includes one or more sensors 128, an energy storage module 124, a power plant 122, an altitude controller 126, a transceiver 132, and other on-board equipment 130. The transceiver 132 is configured to wirelessly communicate data between the aerial vehicle 132 and the computing devices 104 and/or data sources 106 by way of the wireless communication link 108 and/or the communication link 110, respectively.

In some embodiments, the sensors 128 include a global position satellite (GPS) sensor that senses and outputs location data, such as latitude, longitude, and/or altitude data corresponding to a latitude, longitude, and/or altitude of the aerial vehicle 102 in the earth's atmosphere. The sensors 128 are configured to provide the location data to the computing devices 104 by way of the wireless transceiver 132 and the wireless communication link 108 for use in controlling the aerial vehicle 102, as described in further detail below.

The energy storage module 124 includes one or more batteries that store electrical energy provided by the solar panels 134 for use by the various components of the aerial vehicle 102. The power plant 122 obtains electrical energy stored by the energy storage module 124 and converts and/or conditions the electrical energy to a form suitable for use by the various components of the aerial vehicle 102.

The altitude controller 126 is configured to control the ballonets 116 to adjust the buoyancy of the aerial vehicle 102 to assist in controlling its position and/or movement during flight. As described below in further detail, in various embodiments the altitude controller 126 is configured to control the ballonets 116 based at least in part upon an altitude command that is generated by, and received from, the computing devices 104 by way of the wireless communication link 108 and the transceiver 132. In some examples, the altitude controller 126 is configured to implement the altitude command by causing the actuation of the air-gas altitude control system based on the altitude command.

The on-board equipment 130 may include a variety of types of equipment, depending upon the application or needs, as outlined above. For example, the on-board equipment 130 may include LTE transmitters and/or receivers, weather sensors, imaging equipment, and/or any other suitable type of equipment.

Figure 2:
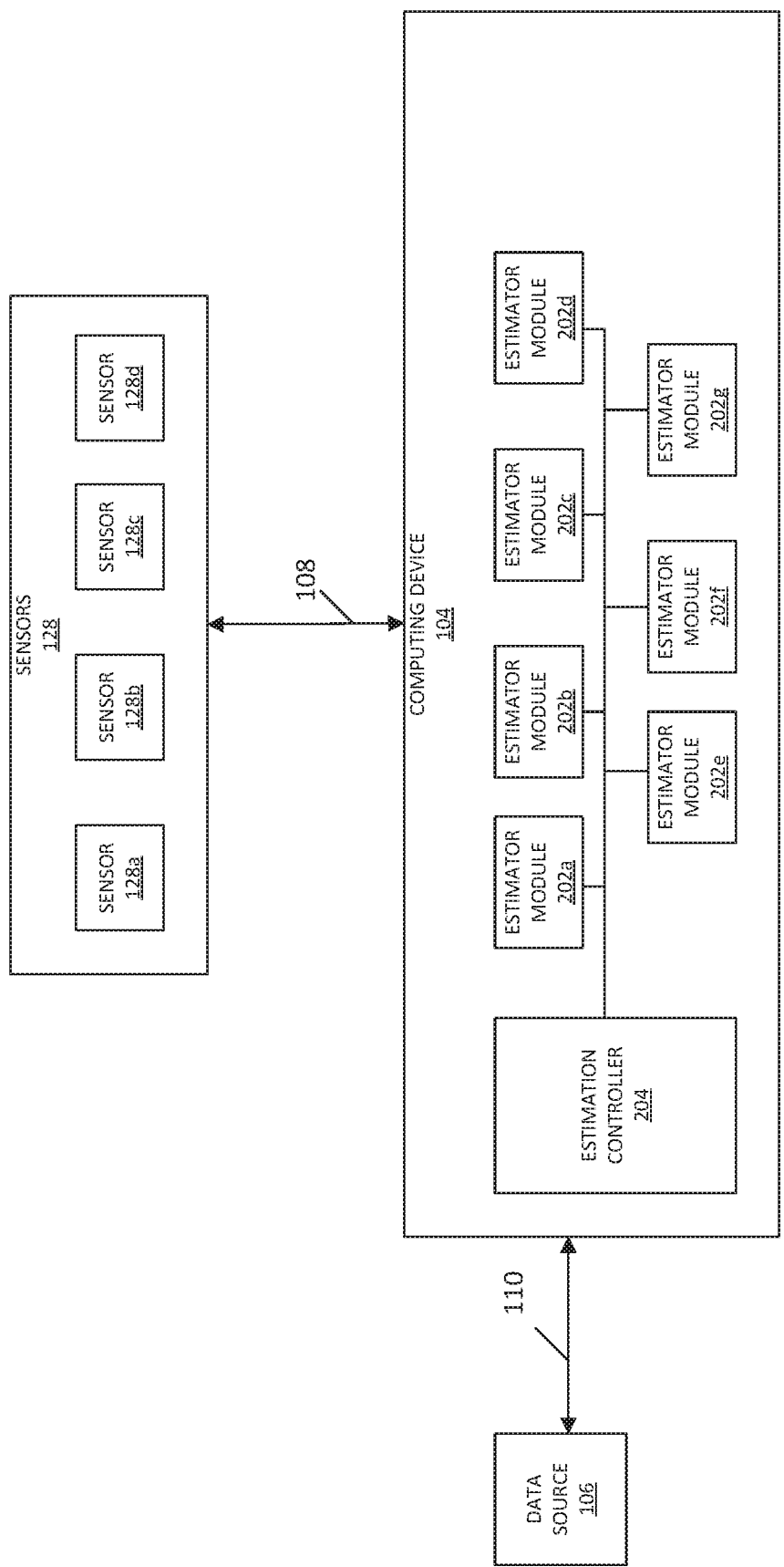
FIG. 2 is a schematic diagram showing additional aspects of the aerial vehicle system of FIG. 1, in accordance with an embodiment of the present disclosure.
Figure 4:
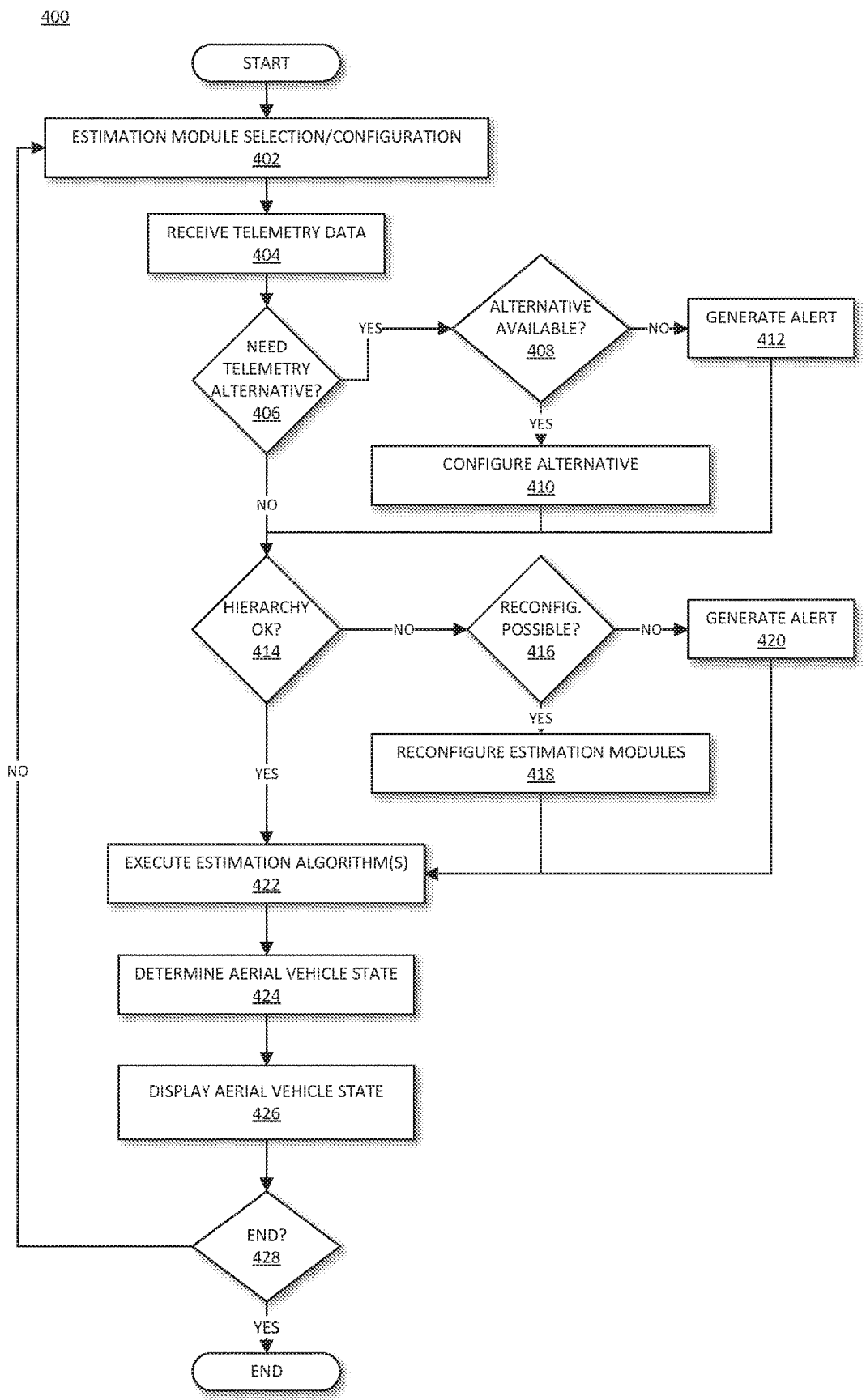
FIG. 4 is a flowchart showing an illustrative method for estimating aerial vehicle status, in accordance with an embodiment of the present disclosure.

Having provided an overview of the aerial vehicle system 100 in the context of FIG. 1, reference is now made to FIG. 2, which shows certain portions of the aerial vehicle system 100, in accordance with an embodiment of the present disclosure. In particular, FIG. 2 illustrates an example embodiment of how functionality and corresponding components are allocated among the aerial vehicle 102, the computing devices 104, and/or the data sources 106, to estimate a status of the aerial vehicle 102, and/or control the aerial vehicle 102 accordingly. Although more detailed aspects of how the system 100 estimates a status of the aerial vehicle 102 are provided below in the context of FIG. 4, FIG. 2 provides an overview of the functionality and component allocation. The arrangement of components depicted in FIG. 2 is provided by way of example and not limitation. Other arrangements of components and allocations of functionality are contemplated, for instance, with the aerial vehicle 102 including components that implement functionality shown in FIG. 2 as being implemented by the computing devices 104, or vice versa. However, in the example shown in FIG. 2, a majority of components and functionality are allocated to the computing devices 104 instead of to the aerial vehicle 102, which decreases the amount of energy required to operate the components of the aerial vehicle 102 and thus enables the components of the aerial vehicle 102 to utilize a greater portion of the available energy than would be possible if more components and functionality were allocated to the aerial vehicle 102. This increases the capabilities of the aerial vehicle 102 for implementing functionality and/or providing services for a given amount of available energy.

As shown in FIG. 2, the aerial vehicle 102 includes multiple sensors 128a through 128d (collectively, 128) that are configured to provide to the computing device 104 various types of sensor data (also referred to herein as telemetry data) during flight by way of the communication link 108. The computing device 104 includes an array of estimator modules 202a through 202g (collectively, 202) and an estimation controller 204. As described in further detail below, the estimator modules 202 are generally configured to estimate respective estimation algorithms to estimate the status of a variety of parameters, such as a status of the aerial vehicle 102 in general, a status of a particular aspect of the aerial vehicle 102, a status of an environment in which the aerial vehicle 102 is positioned, and/or the like. The estimation controller 204 performs a variety of functions, including facilitating configuration of the various estimator modules 202a through 202g, based on any number of a variety of factors, such as predetermined rules, user input, availability of telemetry data, content of telemetry data, reliability of telemetry data, and/or the like. Once the aerial vehicle 102 is in flight in the atmosphere, the sensors 128 are configured to periodically transmit to the estimation controller 204, by way of the transceiver 132 and the wireless communication link 108, telemetry data, such as timestamped GPS positions of the aerial vehicle 102 at corresponding times. The estimation controller 204 is configured to utilize the telemetry data obtained from the sensors 128 in configuring the estimator modules 202 and/or executing the respective estimation algorithms associated therewith.

Figure 3:
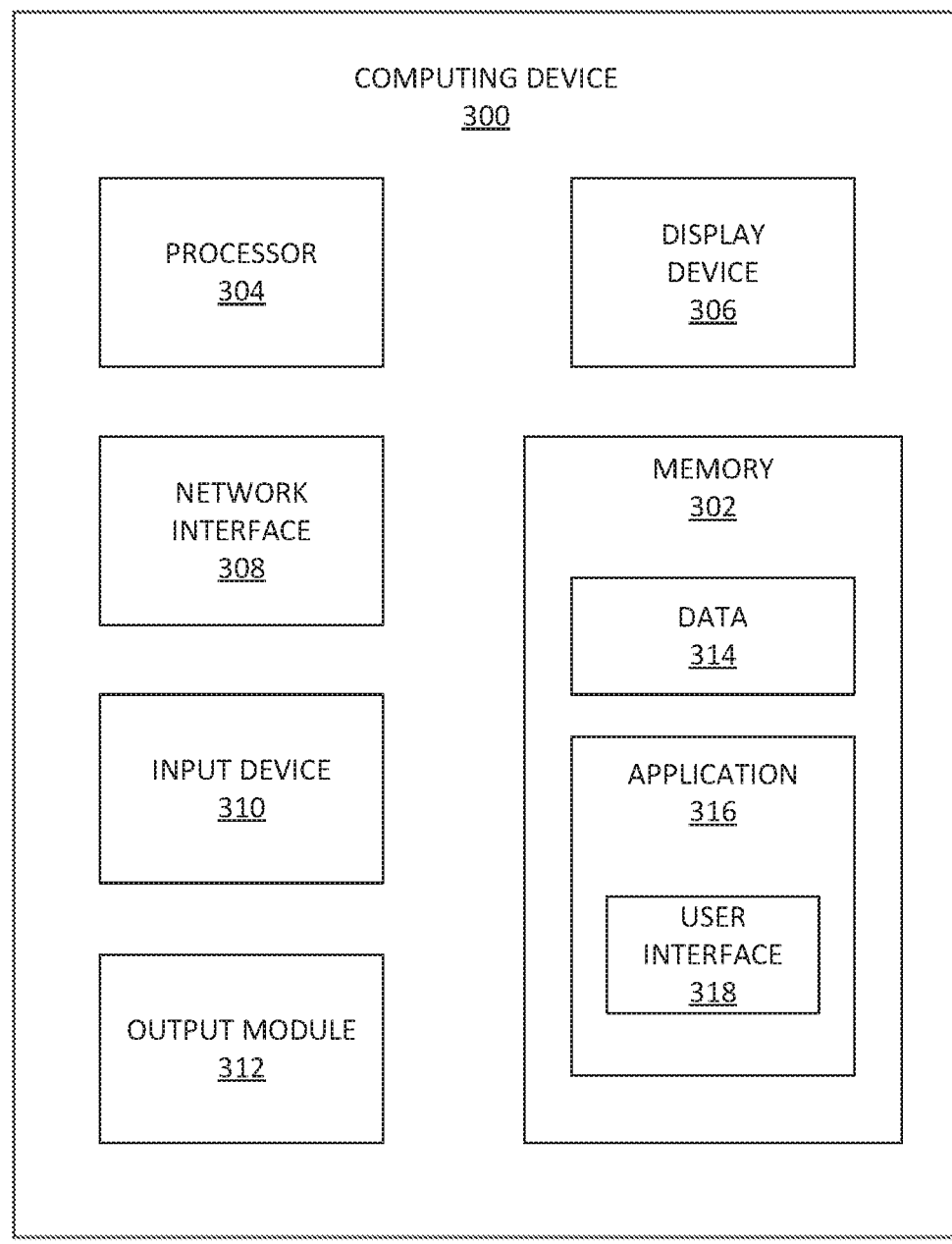
FIG. 3 is a schematic block diagram of an illustrative embodiment of a computing device that may be employed in various embodiments of the present system, for instance, as part of the system or components of FIG. 1 or 2, in accordance with an embodiment of the present disclosure.

FIG. 3 is a schematic block diagram of a computing device 300 that may be employed in accordance with various embodiments herein. Although not explicitly shown in FIG. 1 or FIG. 2, in some embodiments, the computing device 300, or one or more of the components thereof, may further represent one or more components (e.g., the computing device 104, components of the gondola 114, the data sources 106, and/or the like) of the system 100. The computing device 300 may, in various embodiments, include one or more memories 302, processors 304, display devices 306, network interfaces 308, input devices 310, and/or output modules 312. The memory 302 includes non-transitory computer-readable storage media for storing data and/or software that is executable by the processor 304 and which controls the operation of the computing device 300. In embodiments, the memory 302 may include one or more solid-state storage devices such as flash memory chips. Alternatively, or in addition to the one or more solid-state storage devices, the memory 302 may include one or more mass storage devices connected to the processor 304 through a mass storage controller (not shown in FIG. 3) and a communications bus (not shown in FIG. 3). Although the description of computer readable media contained herein refers to a solid-state storage, it should be appreciated by those skilled in the art that computer-readable storage media can be any available media that can be accessed by the processor 304. That is, computer readable storage media includes non-transitory, volatile and non-volatile, removable and non-removable media implemented in any method or technology for storage of information such as computer-readable instructions, data structures, program modules or other data. Examples of computer-readable storage media include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by computing device 300.

In some embodiments, the memory 302 stores data 314 and/or an application 316. In some aspects the application 316 includes a user interface component 318 that, when executed by the processor 304, causes the display device 306 to present a user interface (not shown in FIG. 3). The network interface 308, in some embodiments, is configured to couple the computing device 300 and/or individual components thereof to a network, such as a wired network, a wireless network, a local area network (LAN), a wide area network (WAN), a wireless mobile network, a Bluetooth network, the Internet, and/or another type of network. The input device 310 may be any device by means of which a user may interact with the computing device 300. Examples of the input device 310 include without limitation a mouse, a keyboard, a touch screen, a voice interface, and/or the like. The output module 312 may, in various embodiments, include any connectivity port or bus, such as, for example, a parallel port, a serial port, a universal serial bus (USB), or any other similar connectivity port known to those skilled in the art.

FIG. 4 is a flowchart showing an illustrative method 400 for estimating aerial vehicle status, in accordance with an embodiment of the present disclosure. In some embodiments, each of the estimator modules 202 has a corresponding input and a corresponding output, and is independently configurable to be enabled or disabled such that its corresponding estimation algorithm is either performed or not as needed, for example based on a predetermined rule, a user preference, a need of a particular application, and/or the like. At block 402, the estimator modules 202 are selected and/or configured for operation. By enabling the estimator modules 202 to be independently enabled or disabled, the efficiency of executing estimation algorithms by the computing devices 104 may be improved, since estimator modules 202 that are not needed for a given circumstance may be prevented from expending processing and energy resources.

In some examples, the estimator modules 202 are completely independent from one another and may be independently enabled or disabled. In other examples, the estimation algorithms of some of the estimator modules 202 may be dependent upon an output of another estimation algorithm. In such instances, each of the estimation modules 202 (or its corresponding estimation algorithm) may be associated with a respective hierarchy level in a dependency tree of hierarchy levels that define an order by which the plurality of estimation modules 202 are to be executed. The hierarchy and/or dependency tree defines, for each estimation module 202 (or its corresponding estimation algorithm), any other estimation modules 202 (or estimation algorithms) that are prerequisites and are to be executed before the execution of the instant estimation module 202. The estimator modules 202 may be independently enabled or disabled, subject to compliance with the hierarchy. In such embodiments, the hierarchy or dependency tree may also be configured at block 402.

At block 404, telemetry data is received from the sensors 128 by way of the communication link 108. At block 406, the estimation controller 204 determines whether any telemetry alternative is needed. The determination at block 406 may be based on one or more of a variety of factors, such as predetermined rules, the availability of telemetry data, content of telemetry data, reliability of telemetry data, and/or the like. For instance, in one example, the estimation controller 204 detects a failure of a particular one of the sensors 128 of the aerial vehicle and, in response, automatically switches to a secondary data source, as described below in connection with blocks 408 and 410. The secondary source may include a backup sensor 128 of the aerial vehicle 102, a sensor of another aerial vehicle (not shown in the figures), a weather data source 106, or another one of the estimation modules 202 configured to generate an estimate of the parameter that would have been provided by the failed sensor 128 if it were operational. If the estimation controller 204 determines at block 406 that no telemetry alternative is needed ("NO" at block 406), then control passes to block 414, which is described below. If, on the other hand, the estimation controller 204 determines at block 406 that a telemetry alternative is needed ("YES" at block 406), then control passes to block 408.

At block 408, the estimation controller 204 determines whether any telemetry alternative is available. The determination at block 408 may be based on one or more of a variety of factors. For example, the estimation controller 204 may determine whether a backup sensor 128 of the aerial vehicle 102 is available that is configured to measure and report on the same parameter(s) that the failed sensor 128 otherwise would have measured and reported. The estimation controller 204 may determine whether a sensor of another aerial vehicle (not shown in the figures) is available that is able to provide data similar to that which otherwise would have been provided by the failed sensor 128. In this regard, a sensor of another aerial vehicle may be a suitable alternative if the aerial vehicle is contemporaneously located within a predetermined distance of the aerial vehicle 202 having the failed sensor 128. The estimation controller 204 may determine whether a weather data source 106 is available that could provide the data missing from the failed sensor 128. The estimation controller 204 may determine whether another one of the estimation modules 202 may be configured to generate an estimate of the parameter that would have been provided by the failed sensor 128 if it were operational. The estimation controller 204, in some examples, may configure multiple alternatives to compensate for the failed sensor 128. Additionally, if more than one sensor 128 has failed, or if the alternative data source has failed or is no longer available, the estimation controller 204 may continue to identify any alternatives that may be available to ensure proper functionality of the system 100 despite the failures.

If the estimation controller 204 determines at block 408 that a telemetry alternative is available ("YES" at block 408), then at block 410 the estimation controller 204 configures the one or more telemetry alternatives that were identified at block 408 to provide the data as needed in view of the failed sensor 128. If the estimation controller 204 determines at block 408 that no telemetry alternative is available ("NO" at block 408), then at block 412 the estimation controller 204 may generate an alert to indicate that no alternative is available for the failed sensor 128. From block 410 or 412, control passes to block 414.

At block 414, the estimation controller 204 verifies that the hierarchy or dependency tree that was configured at block 402 is satisfied. For instance, if a particular estimation module 202 is to be executed, the estimation controller 204 verifies that any other estimator modules 202 that are prerequisites for that particular estimation module 202 are enabled and have sufficient data to be executed, for instance, based on the availability of telemetry data from the sensors 128. The estimation controller 204 may also determine whether any estimation modules 202 are enabled that need not be enabled given the particular desired estimation algorithm outputs. If the estimation controller 204 determines at block 414 that the hierarchy is satisfied ("YES" at block 414), then control passes to block 422. If the estimation controller 204 determines at block 414 that the hierarchy is unsatisfied in any way ("NO" at block 414), then control passes to block 416.

At block 416, the estimation controller 204 determines whether any reconfiguration is possible to satisfy the hierarchy. For example, the estimation controller 204 may determine that enabling a particular estimation module 202 that previously was disabled would satisfy the hierarchy. The estimation controller 204 may determine that configuring an alternative data source to the sensors 128 may be necessary to satisfy the hierarchy. As part of the determination at block 416, the estimation controller 204 may determine that multiple reconfigurations are needed to satisfy the hierarchy. For example, the estimation controller 204 may determine that a particular disabled estimation module 202 needs to be enabled, but that that previously disabled estimation module 202 requires data from a sensor 128 that has failed. The estimation controller 204 may thus also identify an alternative to the failed sensor 128 at block 416, in an effort to satisfy the hierarchy based on all available resources. The estimation controller 204 may also determine that one or more enabled estimation modules 202 may be disabled without impacting the particular desired estimation algorithm outputs of the computing device 104, for instance, to decrease energy usage.

If the estimation controller 204 determines at block 416 that a reconfiguration is possible ("YES" at block 416), then at block 418 the estimation module 204 completes the reconfiguration to satisfy the hierarchy, as described above. If the estimation controller 204 determines at block 416 that reconfiguration is impossible in whole or in part ("NO" at block 416), then at block 418 the estimation controller 204 generates an alert to indicate that reconfiguration is impossible. From block 418 or block 420, control passes to block 422.

At block 422, the estimation controller 204 executes the enabled estimation algorithms by way of the respective enabled estimation modules 202, based on the configuration completed at block 402, the telemetry data received at block 404, and/or the alternatives configured at block 410 and/or block 418 (if applicable). The estimation modules 202 that are employed at block 422 to execute the respective estimation algorithms may include one or more of a variety of types of estimation modules 202, and may generate a variety of types of estimation algorithm results. The executing of the estimation algorithms as block 422 may include executing multiple estimation algorithms, which correspond to multiple estimation modules 202, respectively, in an order defined by their hierarchy levels. The executing of the estimation algorithms at block 422 may include filtering the telemetry data received at block 404, and/or supplementing a missing portion of the telemetry data with estimated telemetry data, for instance, based on the alternative configured at block 408. The executing of the estimation algorithms at block 422 may include combining data (for instance, telemetry data, wind data, temperature data, and/or infrared data) obtained from multiple sources (multiple sensors 128 of the aerial vehicle 102, weather data sources 106, and/or the like). The executing of the estimation algorithms at block 422 may include identifying an error in the telemetry data that was obtained at block 404, and generating a correction to the error in the telemetry data (for instance, estimating biases, filtering noise, detecting spikes due to sensor malfunctions, patching missing telemetry, and/or the like).

At block 424, the estimation controller 204 determines a state or status of the aerial vehicle 102 (for instance, a present state of the aerial vehicle 102 based on the most recently obtained and up-to-date information) based on the results of the estimation algorithms executed at block 422. The determination of the state of the aerial vehicle 102 at block 424 may be based on one or more of a variety of factors. The estimation controller 204 may use physical insights and/or equations to infer statuses that may not be directly measured (or at least statuses for which no direct measurements are presently available), such as an amount of gas remaining in the aerial vehicle 102, a predicted remaining flight lifetime of the aerial vehicle 102, and/or the like.

At block 426, the estimation controller 204 may trigger or cause one or more actions to be taken based on the state of the aerial vehicle 102 determined at block 424. For example, the estimation controller 204 may generate a graphical representation of the state or status of the aerial vehicle 102 determined at block 424. In various embodiments, the graphical representation generated at block 426 may take one or more of a variety of forms, such as a numerical indicator, a linear graph plotting the determined state of the aerial vehicle against time or another variable, and/or the like that may be presented to a user, such as a flight engineer, via a graphical user interface. In some examples, the state or status of the aerial vehicle determined at block 424 and/or displayed (e.g., as an estimation graph) at block 426 can be used to normalize a state vector across historical flight data and different versions of aerial vehicles 102. The output of the estimation graph, for example, can be an input to other systems, e.g., for automation or simulation. If two aerial vehicles 102 have different sensors, a different data format, and/or other differences, the estimation graph can account for such variants, such as by using different estimator modules 202, reading different input channels, and/or the like, and can provide a normalized data output. This can be beneficial in facilitating operation of a heterogeneous fleet of aerial vehicles 102 by way of a single fleet control system, despite some of the aerial vehicles 102 of the fleet being older and/or different with respect to one another. In other examples, the estimation controller 204 may generate an alert at block 426 based on the state of the aerial vehicle 102 determined at block 424 and a predetermined rule that indicates for which states an alert should be generated.

At block 428, the estimation controller 204 determines whether the procedure 400 is to be terminated, for instance, based on a user command, or a predetermined rule. If the estimation controller 204 determines at block 428 that the procedure 400 is to be terminated ("YES" at block 428), then the procedure 400 is terminated. If, on the other hand, the estimation controller 204 determines at block 428 that the procedure 400 is not to be terminated ("NO" at block 428), then control passes back to block 402 to select and/or configure (or reconfigure) the estimation modules 202 and execute another iteration of the procedure 400 in the manner described above.

The embodiments disclosed herein are examples of the present systems and methods and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present information systems in virtually any appropriately detailed structure. Like reference numerals may refer to similar or identical elements throughout the description of the figures.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems and/or methods described herein may utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms. In example embodiments that employ a combination of multiple controllers and/or multiple memories, each function of the systems and/or methods described herein can be allocated to and executed by any combination of the controllers and memories.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more non-transitory computer-readable or machine-readable media or memory. The term "memory" may include a mechanism that provides (in an example, stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

The foregoing description is only illustrative of the present systems and methods. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for estimating aerial vehicle status, comprising:
    an aerial vehicle including a sensor that outputs telemetry data;
    a computing device including a processor and a memory; and
    a wireless communication link that communicatively couples the aerial vehicle and the computing device,
    wherein the memory stores instructions that, when executed by the processor, cause the computing device to:
        retrieve the telemetry data from the sensor via the wireless communication link,
        detect a failure of the sensor of the aerial vehicle;
        determine whether a telemetry alternative is available, including determining whether a sensor of another aerial vehicle is available to provide data similar to that which otherwise would have been provided by the sensor;
        in response to determining the telemetry alternative is available, configure the telemetry alternative in response to the failure of the sensor;
        execute an estimation algorithm, by an estimation module configured to estimate a status of a parameter and selected from a plurality of estimation modules configured to estimate a state of the aerial vehicle, based at least in part on the telemetry data, and
        determine the state of the aerial vehicle based on a result of the estimation algorithm,
        wherein the plurality of estimation modules comprises a dependency tree, one or more of the plurality of estimation modules dependent on a prerequisite estimation module.

2. The system of claim 1, wherein the telemetry alternative includes a backup sensor of the aerial vehicle, a sensor of another aerial vehicle.

3. The system of claim 1, wherein the memory stores further instructions that, when executed by the processor, cause the computing device to execute a plurality of estimation algorithms by way of the plurality of estimation modules, each having a corresponding input, output, and hierarchy level within the dependency tree, wherein hierarchy levels in the dependency tree define an order by which the plurality of estimation modules are executed.

4. The system of claim 3, wherein the memory stores further instructions that, when executed by the processor, cause the computing device to execute the plurality of estimation algorithms in the order defined by the hierarchy levels.

5. The system of claim 1, wherein the executing of the estimation algorithm includes at least one of filtering the telemetry data or supplementing a missing portion of the telemetry data with estimated telemetry data.

6. The system of claim 1, wherein the executing of the estimation algorithm includes combining a plurality of data from a plurality of sources, respectively, wherein the plurality of data includes at least one of the telemetry data, wind data, temperature data, or infrared data, and wherein the plurality of sources includes at least one of a plurality of sensors of the aerial vehicle or weather data sources.

7. The system of claim 1, wherein the determining of the state of the aerial vehicle includes determining an amount of gas remaining in the aerial vehicle. input and a corresponding output, and each being independently configurable to be enabled or disabled.

8. The system of claim 1, wherein the determining of the state of the aerial vehicle includes determining a predicted remaining flight lifetime of the aerial vehicle.

9. The system of claim 1, wherein the determining of the state of the aerial vehicle includes determining a present state of the aerial vehicle.

10. The system of claim 1, wherein the executing of the estimation algorithm includes detecting an error in the telemetry data and generating a correction to the error.

11. The system of claim 1, wherein the memory stores further instructions that, when executed by the processor, cause the computing device to generate an alert based on a predetermined rule and the determined state of the aerial vehicle.

12. The system of claim 1, wherein the memory stores further instructions that, when executed by the processor, cause the computing device to generate a graphical representation of the determined state of the aerial vehicle.

13. The system of claim 12, wherein the graphical representation of the determined state of the aerial vehicle includes a linear plot of the determined state of the aerial vehicle against another variable.

14. The system of claim 1, wherein the estimation algorithm is dependent on an output of another estimation algorithm executed by another estimation module in the dependency tree.

15. The system of claim 1, wherein the telemetry alternative comprises at least one of the another sensor, a weather data source, or an estimation module.

16. A method for estimating aerial vehicle status, comprising:
retrieving, by way of a wireless communication link, telemetry data from a sensor of an aerial vehicle;
detecting a failure of the sensor of the aerial vehicle;
determining whether a telemetry alternative is available, including determining whether another sensor of another aerial vehicle is available to provide data similar to that which otherwise would have been provided by the sensor;
in response to determining the telemetry alternative is available, configuring the telemetry alternative in response to the failure of the sensor;
executing an estimation algorithm, by an estimation module configured to estimate a status of a parameter and selected from a plurality of estimation modules configured to estimate a state of the aerial vehicle, based at least in part on the telemetry data; and
determining the state of the aerial vehicle based on a result of the estimation algorithm,
wherein the plurality of estimation modules comprises a dependency tree, one or more of the plurality of estimation modules dependent on a prerequisite estimation module.

17. The method of claim 16, further comprising:
executing a plurality of estimation algorithms by way of the plurality of estimation modules, each having a corresponding input, output, and hierarchy level within the dependency tree, wherein hierarchy levels in the dependency tree define an order by which the plurality of estimation modules are executed.

18. The method of claim 16, wherein executing the estimation algorithm is dependent on an output of another estimation algorithm executed by another estimation module in the dependency tree.

19. A non-transitory computer-readable medium having stored thereon instructions that, when executed by a processor, cause the processor to:
retrieve, by way of a wireless communication link, telemetry data from a sensor of an aerial vehicle;
detect a failure of the sensor of the aerial vehicle;
determine whether a telemetry alternative is available, including determining whether another sensor of another aerial vehicle is available to provide data similar to that which otherwise would have been provided by the sensor;
in response to determining the telemetry alternative is available, configure the telemetry alternative in response to the failure of the sensor;
execute an estimation algorithm, by the estimation module, based at least in part on the telemetry data; and
determine a state of the aerial vehicle based on a result of the estimation algorithm
wherein the plurality of estimation modules comprises a dependency tree, one or more of the plurality of estimation modules dependent on a prerequisite estimation module.

* * * * *